(12) United States Patent
Jones et al.

(10) Patent No.: US 6,847,247 B2
(45) Date of Patent: Jan. 25, 2005

(54) JITTERY POLYPHASE CLOCK

(75) Inventors: Ian W. Jones, Palo Alto, CA (US); Ivan E. Sutherland, Santa Monica, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 55 days.

(21) Appl. No.: 10/304,667

(22) Filed: Nov. 25, 2002

(65) Prior Publication Data

US 2003/0098726 A1 May 29, 2003

Related U.S. Application Data

(60) Provisional application No. 60/333,710, filed on Nov. 27, 2001.

(51) Int. Cl.[7] .................................................. H03K 3/00
(52) U.S. Cl. ........................................ 327/291; 327/293
(58) Field of Search ................................. 327/291, 293, 327/295, 231, 237, 239, 245, 258, 259

(56) References Cited

U.S. PATENT DOCUMENTS

| | | | | |
|---|---|---|---|---|
| 4,554,465 A | * | 11/1985 | Koike | 327/258 |
| 5,652,733 A | * | 7/1997 | Chen et al. | 365/233 |
| 6,304,125 B1 | * | 10/2001 | Sutherland | 327/295 |

* cited by examiner

Primary Examiner—Linh My Nguyen
(74) Attorney, Agent, or Firm—Townsend and Townsend and Crew LLP

(57) ABSTRACT

A plurality of clock signal phases are distributed to a circuit and at least one jitter source is coupled between at least two selected clock phases of the plurality of clock signal phases to introduce a jitter between at least the selected two clock signal phases. In a specific embodiment, the clock distribution system provides N clock phases and, if the phases have an order, there is one jitter source provided between each of the first N−1 phases and the following phase, so that each phase has a jitter relative to each other phase. Several implementations are possible for the jitter sources, which can be noise sources or pseudo-random noise sources, depending on which is easier to design and implement in a specific clock distribution system.

11 Claims, 5 Drawing Sheets

JITTERY POLYPHASE CLOCK

CROSS REFERENCES TO RELATED APPLICATION

The present application claims the benefit of priority under 35 U.S.C. § 119 from U.S. Provisional Patent Application Ser. No. 60/333,710, entitled "JITTERY POLYPHASE CLOCK" filed on Nov. 27, 2001, the disclosure of which is hereby incorporated by reference in its entirety for all purposes.

BACKGROUND OF THE INVENTION

The present invention relates to clock distribution circuits for use in distributing a clock signal to a plurality of locations in a circuit where the circuit elements at each of the plurality of locations are synchronous circuits that operate using the clock signal.

One approach to clock distribution on an integrated circuit or circuit board is to lay out traces to route the clock signal to each circuit element that needs to be clocked. Where there are a large number of clocked elements, such as hundreds or more, the clock signal is often applied to a fan-out tree, with a clock input feeding a fan-out device that outputs a plurality of clock signals, which are in turn inputs to other fan-out devices.

At each fan-out device, the clock signal might be amplified by a transistor circuit. When the clock signal transitions, such as from high to low or low to high, the transistor circuit would change state, so that its outputs change state to propagate the clock signal. The clocked circuits also typically contain transistors or other active devices that switch in response to a clock transition. Each of these circuits draws some current from a power supply when it switches, and if all these circuits switch at the same time, the peak current drawn from the supply can be many times greater than the current drawn at other times in the clock cycle. If the power supply has to be designed to handle the peak current and the peak current is much larger than the average current, the power supply might need to be larger just to handle the peak current.

Another undesirable effect of a clocked circuit is that the peak electromagnetic radiation from an electronic device having many clocked circuits is often much larger than the average electromagnetic radiation, due to the increased electrical activity at the clock transitions.

SUMMARY OF THE INVENTION

In one embodiment of a clock distribution system according to the present invention, a plurality of clock signal phases are distributed to a circuit and at least one jitter source is coupled between at least two selected clock phases of the plurality of clock signal phases to introduce a jitter between at least the selected two clock signal phases. In a specific embodiment, the clock distribution system provides N clock phases and, if the phases have an order, there is one jitter source provided between each of the first N−1 phases and the following phase, so that each phase has a jitter relative to each other phase. Several implementations are possible for the jitter sources, which can be noise sources or pseudo-noise sources, depending on which is easier to design and implement in a specific clock distribution system.

In one set of embodiments, the clock distribution system is a polyphase clock distribution system where the number of phases corresponds to the number of stages of an asynchronous FIFO control chain that generates the plurality of clock phases. An example of such a distribution system is shown in U.S. Pat. No. 6,304,125 (U.S. patent application Ser. No. 09/146,815, entitled "METHOD FOR GENERATION AND DISTRIBUTION OF POLYPHASE CLOCK SIGNALS" and filed on Sep. 4, 1998) and U.S. Pat. No. 6,188,262 (U.S. patent application Ser. No. 09/146,810, entitled "SYNCHRONOUS POLYPHASE CLOCK DISTRIBUTION SYSTEM" and filed on Sep. 4, 1998. That disclosure is incorporated by reference herein for all purposes. The jitter sources might be provided by a counterflow pipeline noise ring, wherein control signals flow in a counterflow relationship with control signals in the asynchronous FIFO ring and introduce jitter by the action of at least one arbiter coupling the asynchronous FIFO ring and the counterflow pipeline noise ring due to the arbitration process performed by the arbiter. Alternatively, the jitter sources might be data-dependent pseudo-noise generators or variable delays having delays related to the output of a low frequency oscillator.

One advantage of the polyphase clock circuit with jitter is that synchronously clocked modules or circuits driven by the clock signals will exhibit lower signal peaks in the radiated frequency spectrum of the devices. Another advantage is that the jitter causes the circuits to be less demanding of the power supply, since all the clocked devices will not be drawing peak current simultaneously. Even with the jitter added, it is possible that occasionally all the circuits can switch at about the same time, but the probability is lower.

DESCRIPTION OF THE SPECIFIC EMBODIMENTS

The figures illustrate several embodiments of a polyphase clock circuit that uses variable delays to create relative jitter between the plurality of output clock phases of the polyphase clock circuit. In several instances, the variable delay is provided by a "noise" source. As used herein, "noise source" refers not only to sources of true noise, such as thermal noise, but to circuit components that generate pseudo-random signals as well as any other circuit components that would generate a signal or control the polyphase clock circuit to result in relative jitter between the plurality of output clock phases of the polyphase clock circuit.

Figure 1:
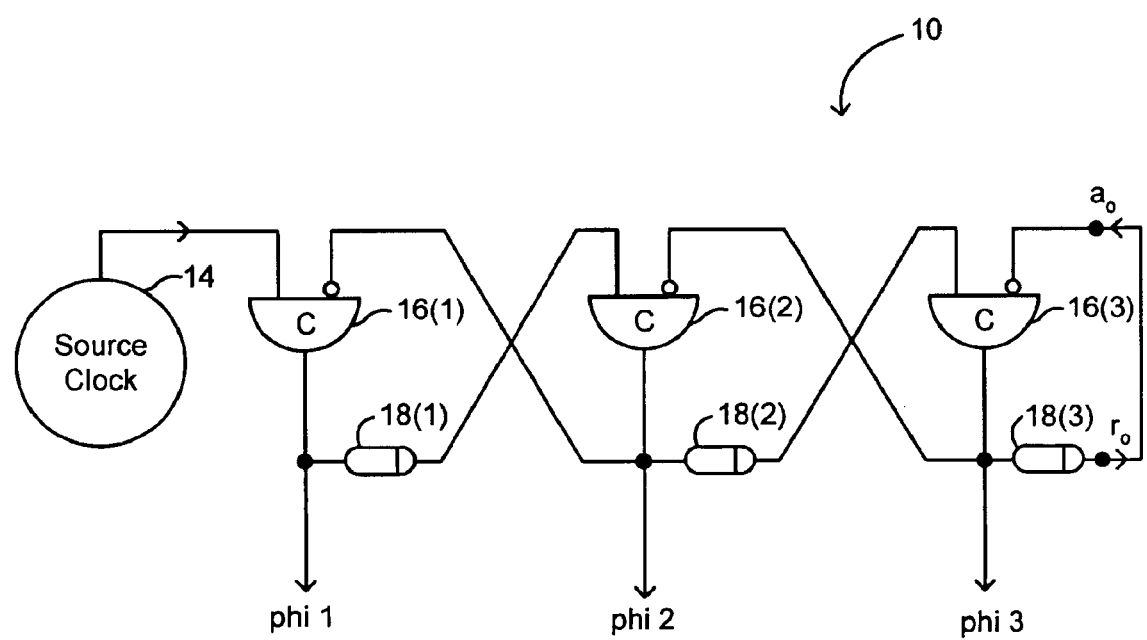
FIG. 1 is a schematic diagram of a polyphase clock circuit that generates polyphase clock signals.

FIG. 1 is a schematic diagram of a basic polyphase clock circuit 10 that generates polyphase clock signals with negligible jitter according to one embodiment of the present invention. Circuit 10 generates a plurality of phases (phi1, phi2, and phi3) that are based on a clock signal from a clock source 14. While circuit 10 is shown generating three phases, it should be understood that the number of phases could be two or more than three.

Circuit 10 comprises a Muller-C element 16 (rendezvous elements) and a delay element 18 for each phase. A Muller-C element is an event driven circuit that outputs a signal at an output after a signal is received at each of its inputs. A signal is typically a rising or falling edge of a voltage on a wire, but signals are not so limited. For example, some Muller-C elements operate with multi-wire lines, where a signal might be defined as the rising or falling edge of the voltage on one wire following a rising or falling edge on another wire or while the other wire is within a particular voltage range. However the signal is defined for a circuit, clock source 14 outputs a clock signal and that output is coupled to a noninverting input of Muller-C element 16(1), the Muller-C element for phase phi1. Generally, in this description, some objects are labeled with a number and a second number in parentheses to specify a specific instance of an object. For example, "Muller C element 16" refers to any one or all of such elements, whereas "Muller C element 16(1)" refers to the first instance of such elements.

As shown in FIG. 1, each of the Muller-C elements 16 has two inputs and one output. The two inputs are referred to herein as the noninverting input and the inverting input, with the inverting input denoted by the small circle at the input. The output of each Muller-C element 16 is an output of the phase corresponding to that Muller-C element. For example, the output of Muller-C element 16(1) provides the clock output of phase phi1. The output of each Muller-C element 16 is also coupled to the input of a corresponding delay element 18. The output of each delay element 18 is coupled to an input of a Muller-C element. In the case of delay elements 18(1) and 18(2), their outputs are coupled to the noninverting inputs of the following phase's Muller-C element (i.e., elements 16(2) and 16(3), respectively). The output of delay element 18(3) (labeled "ro" in FIG. 1) is coupled back to the inverting input of Muller-C element 16(3) (labeled "ao" in FIG. 1).

In operation, delay elements 18 cause a negligible jitter among the phases (phi1, phi2, and phi3). One advantage of introducing relative jitter into delay elements 18 (or otherwise) is that a collection of devices, that are synchronously clocked modules or circuits driven by the clock signals, will exhibit lower signal peaks in the spectrum of the devices. A clock distribution system having such jitter will also be less demanding of the power supply, since all the clocked devices will not be drawing peak current simultaneously. Thus, an integrated circuit or other set of clocked devices could be expected to emit less electromagnetic radiation and have lower peak power demands if the clock distribution system described herein is used.

Note that, in general, with N phases, N−1 jitter sources are sufficient to have jitter present between any two of the N phases. For example, consider FIG. 1, in which N=3. If one jitter source is introduced to vary the delay of delay element 18(1), there will be a relative jitter between phase phi1 and phase phi2. If another jitter source is introduced to vary the delay of delay element 18(2), there will be a relative jitter between phase phi2 and phase phi3. Assuming that the jitter sources are independent, then there will also be a relative jitter between phases phi1 and phi3, i.e., a jitter related to the sum of the jitters of delay elements 18(1) and 18(2). The jitter sources need not be independent, but if they are, relative jitter can be ensured between any two phases.

The relative jitter can be by the action of delay elements 18, or by the inclusion of additional elements to introduce variable delay. FIGS. 2-5 are schematics of circuits employing various elements to create that variable delay.

Figure 2:
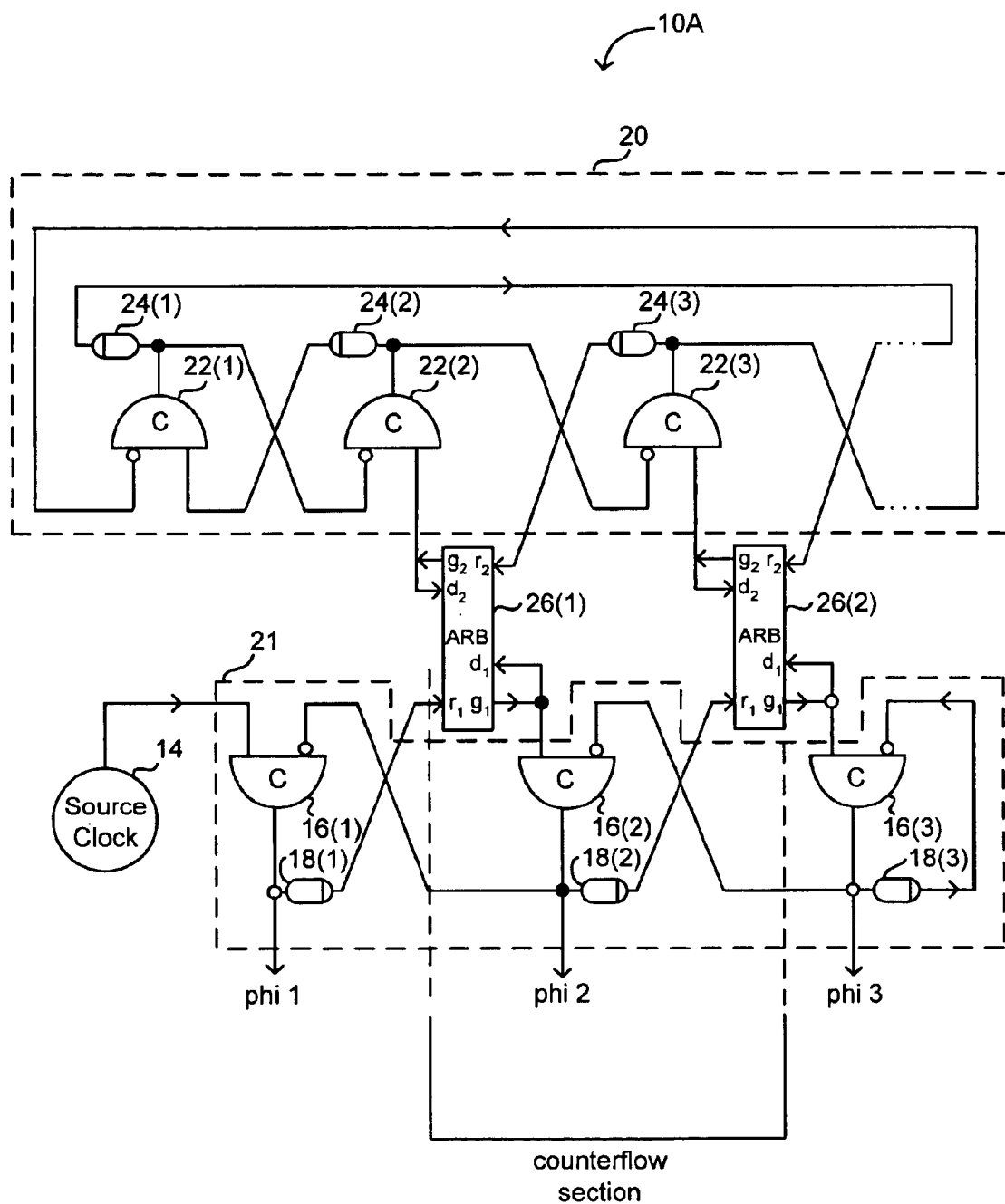
FIG. 2 is a schematic diagram of a polyphase clock circuit in which relative jitter is created using a counterflow noise ring.

FIG. 2 is a schematic diagram of a polyphase clock circuit 10A in which the relative jitter is created using a noise ring 20 in a counterflow arrangement with a clock ring 21, with both noise ring 20 and clock ring 21 acting as FIFO control chains. Noise ring 20 is shown comprising several Muller C elements 22 and corresponding delay elements 24. Noise ring 20 is coupled to the polyphase clock generator (elements 16 and delay elements 18) through arbiters 26.

Specifically, noise ring 20 is shown comprising Muller C elements 22(1), 22(2), 22(3) and dotted lines to suggest that additional Muller C elements might be placed beyond Muller C element 22(3).

A delay element 24 is coupled between each output of its corresponding Muller C element 22 and an input of the immediately prior Muller C element 22, either directly or indirectly through an arbiter. For the purposes of this description, the highest numbered Muller C element (which is 22(3) if only three are used) is considered the "immediately prior" Muller C element to element 22(1), i.e., the Muller C elements are arranged in a "ring". More than three Muller C elements, and a corresponding number of delay elements 24, might be used to "tune" the noise effect.

The noise is coupled into or introduced via clock ring 21 (made up of elements 16, 18) through arbiters 26. While other arbiters might be used, RGD arbiters are used in the example of FIG. 2. RGD arbiters are suitable because, although noise ring 20 and the clock ring 21 are in a counterflow pipeline arrangement, no data interaction takes place. Arbiters 26 enforce sequential crossings of items across each counterflow stage boundary. An item in noise ring 20 would flow in the opposite direction from an item in clock ring 21, so occasionally, they would interact and cause a contested boundary crossing at an arbiter 26. Upon contention, an item in rings 20, 21 would be delayed slightly by the arbiter, thus introducing some jitter into the system.

If such a system is used, care should be taken to handle or deal with the metastability of the arbiter. If the arbiter is metastable for long enough, clock ring 21 could temporarily fill, resulting in "lost" or "missed" clock ticks. Therefore, a clocked module should be designed to avoid catastrophic errors due to missed clock ticks. In many cases, the likelihood of such a metastable event and the possible resulting "failure" is very much like the probability of failure of a synchronizer, so the design and analysis procedures for calculating the failure probability for the metastable event should be very similar to the procedures for calculating the failure probability of a synchronizer. Preferably, the module will not fail catastrophically in the event of a metastability, but will at worst result in a temporary slowdown of the module.

Figure 3:
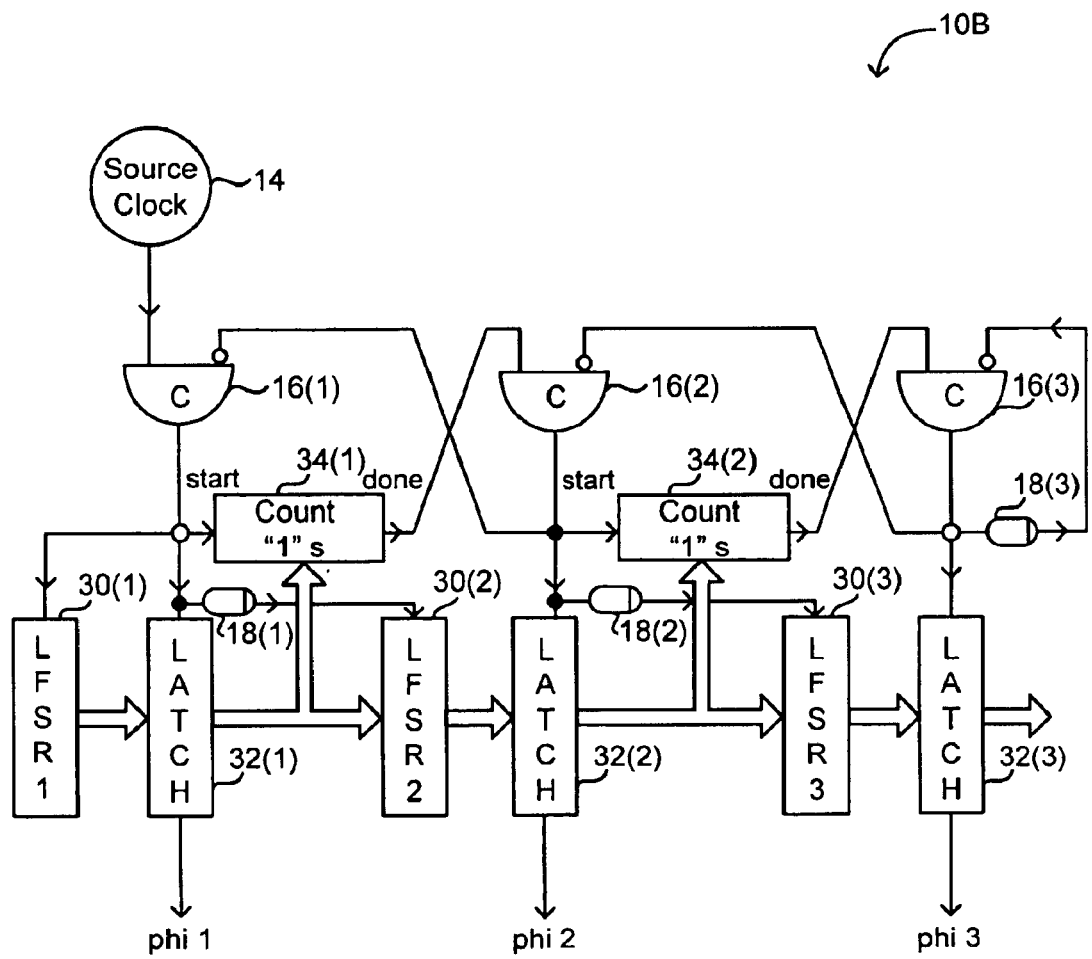
FIG. 3 is a schematic diagram of a polyphase clock circuit in which relative jitter is created using a data dependent noise generator.

FIG. 3 is a schematic diagram of a polyphase clock circuit 10B in which relative jitter is created using a data dependent noise generator. In circuit 10B, the clock ring (elements 16, 18) are used to operate a micropipeline FIFO data path that contains some computation. The micropipeline is shown comprising linear feedback shift registers (LFSR's) 30 interposed between latches 32, where each is controlled by an associated one of Muller C elements 16.

Interposed between at least one pair of Muller C elements 16 is a computation element 34. In the example of FIG. 3, one computation element 34(1) is interposed between Muller C elements 16(1) and 16(2) and another computation element 34(2) is interposed between Muller C elements 16(2) and 16(3). Computation element 34 might perform any one of a number of computations that completes in a time that is data dependent, to introduce small variations in the duration of the computation. In the example of FIG. 3, computation element 34 is a counter that counts the number of 1's in a data word output by an associated one of latches 32.

The input of the FIFO, i.e., the FIFO formed by the connection of linear feedback shift registers (LFSR's) 30 and latches 32, is fed on the fly with data generated by a pseudo-random number generators 30 that is running through a pseudo-random sequence. The output of the calculations need not be used, since only the variability in computation time is needed to introduce jitter in the clock phases.

Figure 4:
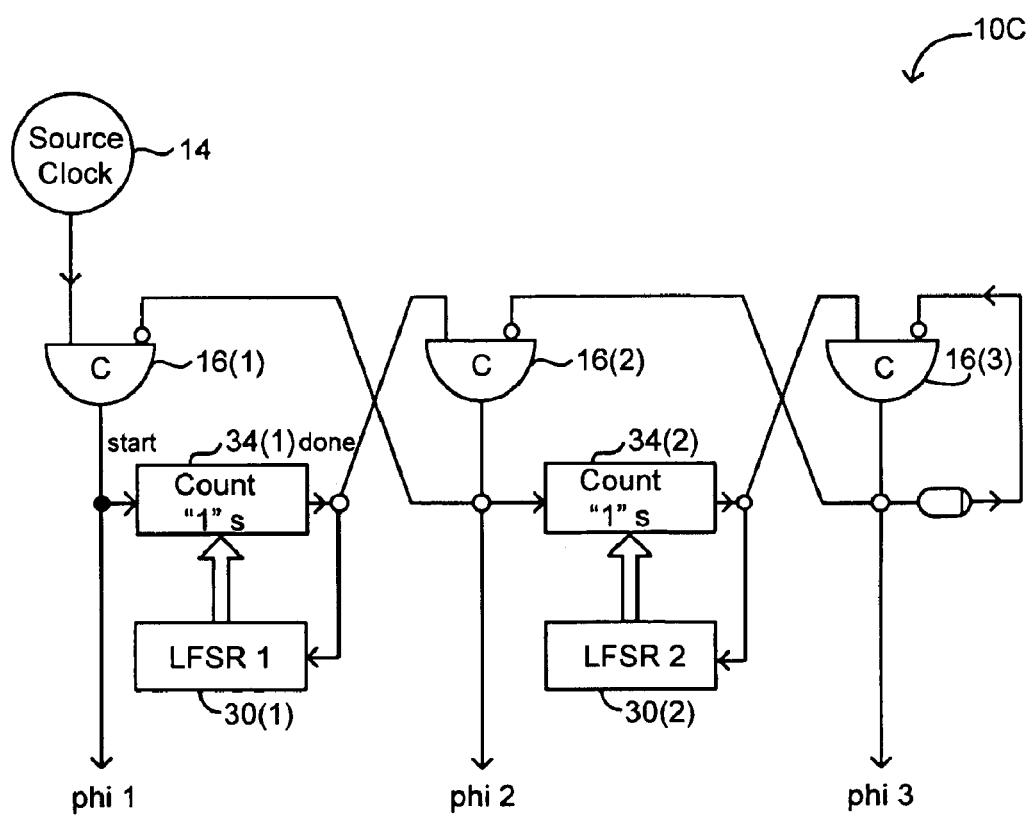
FIG. 4 is a schematic diagram of a polyphase clock circuit in which relative jitter is created using an alternative data dependent noise generator.

Data need not be fed through the FIFO at all, and each stage could contain its own pseudo-random number generator data source, as illustrated by a polyphase clock circuit 10C shown in FIG. 4. Carefully selected pseudo-random number generators would allow for a very large number of sequences over the entire polyphase clock chain before the pattern would repeat, thus making the jitter more random. Preferably, each pseudo-random number generator should have a period that is relatively prime with respect to the periods of other pseudo-random number generators and the sequences of each pseudo-random number generator should preferably be different enough so that two sequences do not correlate over a segment of their sequences.

Figure 5:
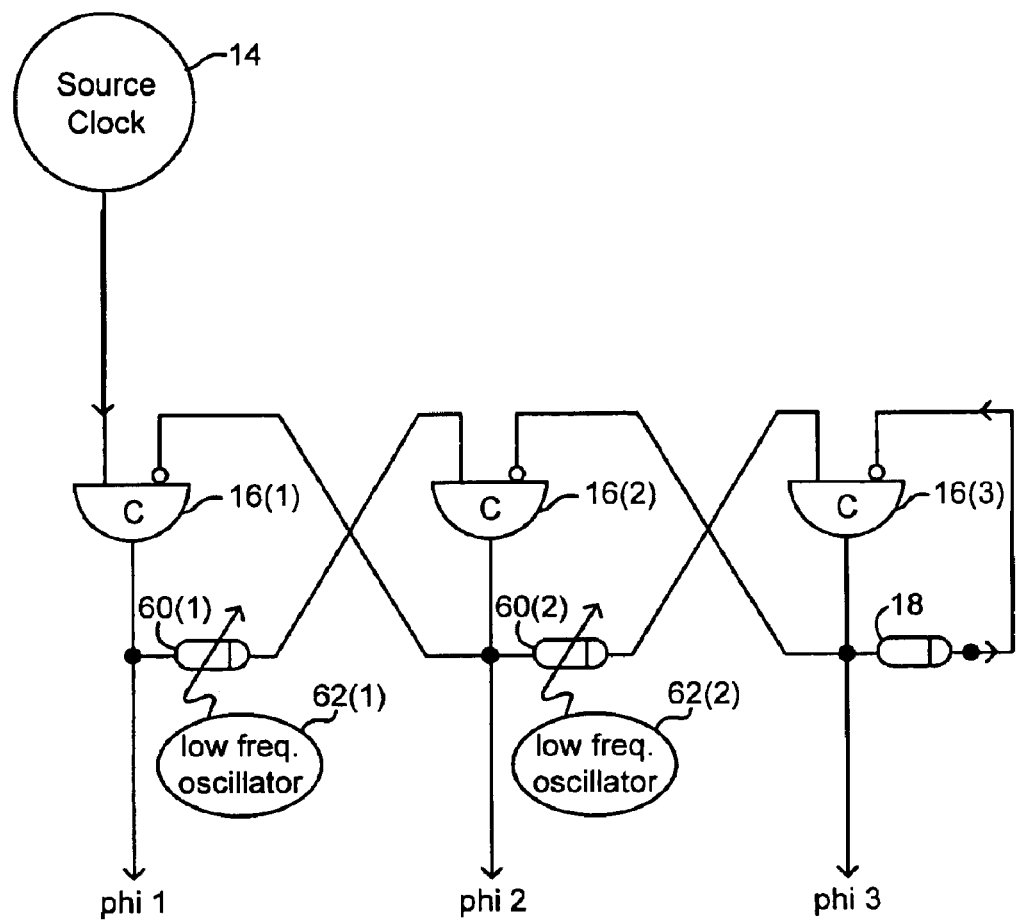
FIG. 5 is a schematic diagram of a polyphase clock circuit in which relative jitter is created using an FM noise injector.

FIG. 5 is a schematic diagram of a polyphase clock circuit 10D in which relative jitter is created using an FM (frequency modulation) noise injector. As shown in FIG. 5, the circuit of FIG. 1 is modified by replacing one or more delay elements 18 with delay elements 60 each controlled by a low frequency oscillator 62. Delay elements 60 are controllable delay elements, with the control input of each element 60 coupled to one of the low frequency oscillators 62. In a preferred embodiment, each low frequency oscillator 62 is a free running low frequency oscillator that runs independently from the other low frequency oscillators.

Delay elements 60 are interposed between stages in the polyphase clock FIFO control chain as shown in FIG. 5. Each low frequency oscillator 62 causes a small amount of frequency modulation between the adjacent polyphase clock signals that are on either side of the low frequency oscillator. An another way to achieve this effect is to modulate the supply voltage to each Muller C element 16 with a low frequency signal.

Due to a variety of considerations, the circuits for introducing jitter shown in FIG. 4 are probably preferred over those of FIG. 5. The circuits that are clocked using these jittery polyphase clocks should be designed to tolerate such small variations in the arrival time of each clock signal. Such a design can lead to requiring slightly larger setup and hold times on the input data of latches, thus consuming a portion of the usable time between stages. However, in many cases these small design disadvantages are outweighed by the advantages described herein.

A polyphase clock distribution system with relative phase jitter has now been described. In some embodiments, the distribution system is implemented as a FIFO control chain with variable delay introduced using one or more circuits that provide delays that vary. Some embodiments, such as those shown in FIGS. 4–5, are simpler than others. In the examples shown, where there are N phases for some non-negative integer N greater than one, there are N–1 variable delay elements so that jitter is present between any two phases. Some clock distribution systems might have less than N–1 variable delay elements to introduce jitter between some of the clock phases if jitter need not be present between any two phases. Other clock distribution systems with N phases might have N variable delay elements. One reason for having N variable delay elements is to allow for a design where each phase uses identical components.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A clock distribution system, wherein a plurality of clock signal phases are disiributed to a circuit, the clock distribution system comprising:

at least one jitter source coupled between at least two selected clock phases of the plurality of clock signal phases to introduce a jitter between at least the selected two clock signal phases, where the jitter is a small phase shift;

wherein the at least one jitter source is a data-dependent pseudo-random noise generator, wherein the data-dependent pseudo-random noise generator is a circuit that introduces a delay that is dependent on a data calculation, wherein the data calculation completes after a duration that is dependent on the data in the data calculation.

2. The clock distribution system of claim 1, wherein the plurality of clock signal phases is N clock signal phases, where N is an integer greater than one, wherein the at least one jitter source is N–1 jitter sources and wherein the selected clock phases for the N–1 jitter sources is selected such that a jitter is introduced between any two of the N clock signal phases.

3. The clock distribution system of claim 1, wherein the jitter source is a random noise source.

4. The clock distribution system of claim 1, wherein the jitter source is a pseudo-random noise source.

5. The clock distribution system of claim 1, wherein the data-dependent pseudo-random noise generator comprises a pseudo-random number generator that generates a pseudo-random number to be used in the data calculation.

6. The clock distribution system of claim 1, comprising an asynchronous FIFO control chain that generates the plurality of clock phases.

7. The clock distribution system of claim 6, wherein the jitter source is a power supply to one or more stages of that asynchronous FIFO ring that varies a power supply voltage to at least one component of the one or more stages to jitter an output of the one or more stages.

8. A clock distribution system, wherein a plurality of clock signal phases are distributed to a circuit, the clock distribution system comprising:

at least one litter source coupled between at least two selected clock phases of the plurality of clock signal phases to introduce a jitter between at least the selected two clock signal phases, where the jitter is a small phase shift;

an asynchronous FIFO control chain that generates the plurality of clock phases;

a counterflow pipeline noise ring, wherein control signals flow in a counterflow relationship with control signals in the asynchronous FIFO control chain; and at least one arbiter coupling the asynchronous FIFO control chain and the counterflow pipeline noise ring such that jitter is introduced in the control signals in the asynchronous FIFO control chain due to the arbitration process performed by the arbiter.

9. The clock distribution system of claim 8, wherein the at least one arbiter is N–1 arbiters, where N is the number of phases in the plurality of clock phases.

10. The clock distribution system of claim 8, wherein the at least one arbiter is an RGD arbiter.

11. The clock distribution system of claim 1, wherein the jitter source is a variable delay having a delay related to the output of a low frequency oscillator.

* * * * *